(12) United States Patent
Masson et al.

(10) Patent No.: US 7,671,670 B2
(45) Date of Patent: Mar. 2, 2010

(54) DEVICE FOR DEMODULATING A SIGNAL CONTAINING INFORMATION BEING CONVEYED BY PHASE SHIFT KEYING

(75) Inventors: Gilles Masson, Renage (FR); Jacques Reverdy, Crolles (FR)

(73) Assignee: Commissariat a l'Energie Atomique (FR)

( * ) Notice: Subject to any disclaimer, the term of this patent is extended or adjusted under 35 U.S.C. 154(b) by 81 days.

(21) Appl. No.: 12/138,994

(22) Filed: Jun. 13, 2008

(65) Prior Publication Data

US 2009/0045871 A1 Feb. 19, 2009

(30) Foreign Application Priority Data

Jun. 15, 2007 (FR) .................................. 07 04285

(51) Int. Cl.
*H03D 3/00* (2006.01)
*H04L 27/22* (2006.01)

(52) U.S. Cl. ........................ 329/304; 329/305; 329/310; 375/324; 375/329

(58) Field of Classification Search ......... 329/304–310; 375/324, 329–333
See application file for complete search history.

(56) References Cited

U.S. PATENT DOCUMENTS

| | | | |
|---|---|---|---|
| 5,140,278 A | 8/1992 | Kirkham et al. | |
| 5,391,981 A | 2/1995 | Masson | |
| 5,452,325 A | 9/1995 | Brown et al. | |
| 5,990,733 A | 11/1999 | Mahany et al. | |
| 2007/0009056 A1* | 1/2007 | Yeon et al. | 375/260 |
| 2009/0045871 A1 | 2/2009 | Masson et al. | |

FOREIGN PATENT DOCUMENTS

EP 0 414 392 A2 2/1991

OTHER PUBLICATIONS

D. Caucheteux, E. Beigne, M. Renaudin and E. Crochon: "A New Class of Asynchronous Inductive Contactless Devices Using Event Based Communications and Self-Timed Logic", IFIP International Conference on Very Large Scale Integration, VLSI-SoC'05, Perth Australia, Oct. 17-19, 2005 ; p. 83-88.

* cited by examiner

*Primary Examiner*—David Mis
(74) *Attorney, Agent, or Firm*—Lowe Hauptman Ham & Berner, LLP (57) ABSTRACT

The invention relates to a device for demodulating an input signal containing information being conveyed by phase modulation of a carrier wave. A transmitter generates a signal controlling a phase variation in the carrier wave, for each symbol having N cycles, N being an integer strictly greater than 1. The phase variation stretches on the receiver side over n cycles, n being an integer greater than 1 and less than N. The device generates a single pulse for each symbol received suited to generate the leading edge of the pulse corresponding to the symbol considered after a constant duration from the moment the symbol considered starts; and generates the trailing edge of the pulse considered at a moment the phase shift corresponding to the symbol considered has to be measured. Conversion means generate an output signal with a voltage varying as a function of the duration of the pulse produced.

20 Claims, 6 Drawing Sheets

DEVICE FOR DEMODULATING A SIGNAL CONTAINING INFORMATION BEING CONVEYED BY PHASE SHIFT KEYING

RELATED APPLICATIONS

The present application is based on, and claims priority from, French Application Number 07 04285, filed Jun. 15, 2007, the disclosure of which is hereby incorporated by reference herein in its entirety.

FIELD OF THE INVENTION

The invention relates to a device for demodulating a signal containing information being conveyed by phase modulation of a carrier wave. In particular, the invention relates to wireless data transmission systems comprising a transmitter, a transmission channel and a receiver, in which the information is conveyed by phase modulation of a carrier wave (modulation more commonly designated PSK for "Phase Shift Keying").

BACKGROUND OF THE INVENTION

A phase shift keying device is a device generally integrated in a receiver. It notably allows the phase modulation information to be extracted from the carrier wave of a received signal. The phase modulation information is typically delivered by such a device in the form of an electrical signal with a voltage proportional to the phase shift introduced by the transmitter device that has generated and transmitted the received signal.

In the prior art various embodiments of a demodulator device for the phase of a carrier wave exist. These embodiments may notably be divided into three main categories depending on the ratio of the data rate of the information conveyed by the signal received on the one hand and the frequency of the carrier wave of the signal received on the other.

When this ratio is appreciably less than 1%, the device for demodulating the phase of a carrier wave is produced according to an architecture comprising one or more phase locked loops or one or more sensors in quadrature. Such devices comprise filters and mixers.

When this ratio is approximately between 1% and 10%, the device for demodulating the phase of a carrier wave is produced according to an architecture comprising one or more phase locked loops or a ramp-based architecture, qualified as "direct". The direct ramp-based architecture is detailed notably in the communication by D. Caucheteux, E. Beigné, M. Renaudin and E. Crochon entitled "A New Class of Asynchronous Inductive Contactless Devices Using Event Based Communications and Self-Timed Logic", IFIP International Conference on Very Large Scale Integration, VLSI-SoC'05, Perth Australia, 17-19 Oct. 2005.

When this ratio is appreciably more than 10%, the device for demodulating the phase of a carrier wave is produced according to a direct ramp-based architecture. The field of application is then restricted to HF and VHF frequencies.

Numerous technological constraints constrain the design of devices for demodulating the phase of a carrier wave, notably when this ratio is high, for example equal to 37.5% in the RFID application described below. Thus silicon integration technologies require operating at low power-supply voltages, typically 1.2V for a technology with an etching resolution that allows an MOS transistor gate width of 130 nm to be attained. The dynamic voltage of such a device may be defined as the difference between the voltage generated by the device when the phase of the received signal reaches its maximum on the one hand and the voltage generated by said device when the phase of the received signal reaches its minimum on the other hand. The dynamic voltage is notably linked with the voltage resolution and with the number of phase-coding bits. The minimum acceptable resolution is fixed by the minimum noise margin necessary to the application and to a lesser extent by the constraints of the design of the analogue-to-digital converter. In order to increase the data rate when the duration of the symbol time depends on the application and when the minimum resolution is fixed by the constraints of design, the number of phase-coding bits must be increased: the dynamic voltage then increases by a ratio that is a power of 2. For a high data rate, i.e. of around 5 Mbits/s, the ratio of the power-supply voltage of said device to the dynamic voltage of said device (before the analogue-to-digital conversion) must therefore be close to 1.

The document U.S. Pat. No. 5,990,733A discloses a PSK demodulator comprising a ramp-based system. The PSK demodulator delivers an output signal with a voltage that remains constant or varies depending on whether the periods of two consecutive cycles of the signal are identical or vary. The amplitude of these variations depends, among other things, on the phase jump programmed in the transmitter and on the bandwidth of the radiofrequency or inductive connection (transmitter and receiver antennas, channel). However, as described in more detail below, this PSK demodulator only exploits a fraction of the modulation amplitude and proves poor in performance, unusable even when a high data rate is desired. This is all the more critical when the power-supply voltages of the demodulator are low.

SUMMARY OF THE INVENTION

The aim of the invention is notably to solve the aforementioned problems. To this end, the subject of the invention is a device for demodulating an input signal containing information being conveyed by phase modulation of a carrier wave, said signal being generated by means of a transmitter controlling a phase variation in said carrier wave, for each symbol comprising N cycles, N being an integer strictly greater than 1, the phase variation stretching on the receiver side over n cycles, n being an integer greater than 1 and less than N, the device comprising:
 means for generating a single pulse, called the measurement pulse, for each symbol received, said means being suited to:
  generating the first edge of the measurement pulse corresponding to the symbol considered after a first constant duration from the moment the symbol considered starts, this first duration being less than the minimum duration of the n first cycles of a symbol of the input signal; and
  generating the second edge of the measurement pulse corresponding to the symbol considered after a second duration, which may be zero, following the start of the (n+1)th cycle of the symbol considered; and
 conversion means generating an output signal with a voltage varying as a function of the duration of the pulses produced.

The device comprises for example a ramp generator, a comparator and a control clock generator receiving the input signal and generating the first and second control clock signals composed of control pulses, a control pulse being associated with each symbol received, and in which
 a control pulse of the first control clock signal associated with a given symbol has:

a first edge situated in the course of a clock cycle of the preceding symbol, at a moment when the phase shift has restabilized at approximately zero;

a second edge situated after the first edge of the measurement pulse corresponding to the given symbol;

a control pulse of the second control clock signal associated with a given symbol has:

a first edge situated after the first edge of the control pulse of the first control clock signal associated with the given symbol, in the course of a clock cycle of the preceding symbol, at a moment when the phase shift has restabilized at approximately zero or at the latest at the start of the given symbol; and a second edge situated after the first edge of the measurement pulse corresponding to the given symbol;

the ramp generator delivering:

a first ramp $V_1$ during each control pulse of the first control clock signal;

a second ramp $V_2$ during each control pulse of the second control clock signal, the second ramp having a higher slope than that of the first ramp $V_1$; the comparator receiving the first ramp $V_1$ and the second ramp $V_2$ and generating a comparative output signal from which the control clock generator generates the single measurement pulse for each symbol.

The control clock generator generates, for example, for a given symbol:

the first edge of the single measurement pulse at the moment the first ramp $V_1$ and the second ramp $V_2$ intersect; and the second edge of the single measurement pulse after a predefined duration, which may be zero, following the start of the (n+1)th cycle of the given symbol.

In one particular embodiment, the ramp generator comprises capacitors C1, C2 charged at a constant current to generate ramps $V_1$, $V_2$, the capacitances of said capacitors to be charged being different.

The comparator delivers, for example, the comparative signal, the voltage of which in the course of a symbol is:

equal to a first value as long as the first ramp $V_1$ is greater than the second ramp $V_2$;

equal to a second value as soon as the second ramp $V_2$ becomes greater than the first ramp $V_1$;

becomes equal again to the first value on the command of a zero reset signal.

Advantageously, the leading edge of the single measurement pulse for a symbol i may be produced by means of a delay generation circuit, this delay generation circuit detecting a leading or trailing edge of a cycle i-1 of the preceding symbol, at a moment when the phase shift has restabilized at approximately zero.

In another embodiment, the leading edge of the single measurement pulse for a symbol i is produced by means of a delay generation circuit, this delay generation circuit detecting the leading edge of the first cycle of the symbol i and produces, after a predefined duration from the start of this detection, the leading edge of the measurement pulse of the symbol i.

The device according to the invention may notably be used in a radiofrequency identification system with an inductive connection comprising a reader module collaborating with mobile tags, communication capable of being established between the reader module and the mobile tag through an inductive connection with a phase modulated carrier wave, the device according to the invention being included in the mobile tag to effect the demodulation of the phase of the carrier wave received.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

A demodulator device according to the present invention is placed in a receiver able to receive a modulated signal provided by a transmitter. More precisely, the modulated signal is generated by means of a transmitter controlling a phase variation every N cycles of the carrier wave, N being an integer greater than 1. A symbol is equivalent to N cycles of the carrier wave. The phase variation is stretched on the receiver side over n cycles, n being an integer strictly greater than 1 and strictly less than N. The device according to the invention receives an input signal 1. The input signal 1 corresponds to the modulated signal emitted by the transmitter after passing through a transmission channel. The device according to the invention generates an output signal 5, the voltage amplitude of which depends on the total phase shift of the input signal 1.

Advantageously, the invention starts with the observation that for a given symbol consisting of N cycles the phase shift is spread over n cycles. This spread has the consequence of making demodulator systems such as that described, for example, in the previously mentioned document U.S. Pat. No. 5,990,733A ineffective. In particular, in the case of the demodulator described in the document U.S. Pat. No. 5,990,733A the demodulation performance is greatly reduced, since only a fraction of the programmed phase shift can be measured. For example, if it is assumed that the elementary jumps are equispaced over 5 symbol time cycles, the variation in the output signal will correspond to a fraction of the phase shift equal to the elementary jump. The voltage variation at the demodulated output will therefore only represent 20% of the total phase shift. Hence the PSK demodulator described does not allow the total phase variation of the carrier wave to be recovered. In the context of applications in which the phase shift is spread over several cycles of the symbol time, the device described does not allow the elementary phase jumps to accumulate, since only a fraction of the programmed phase shift is recovered, the measurement being carried out cycle by cycle. Consequently, the device of the document U.S. Pat. No. 5,990,733A is little suited to this type of applications.

In practice, the carrier wave of the modulated signal has a predefined period equal to TCIkIN. In the examples described below, the carrier wave is a square pulse signal of the pseudo-clock type having a reference period without modulation equal to TCIkIN. Each square pulse corresponds to one cycle of this pseudo-clock.

Figure 1:
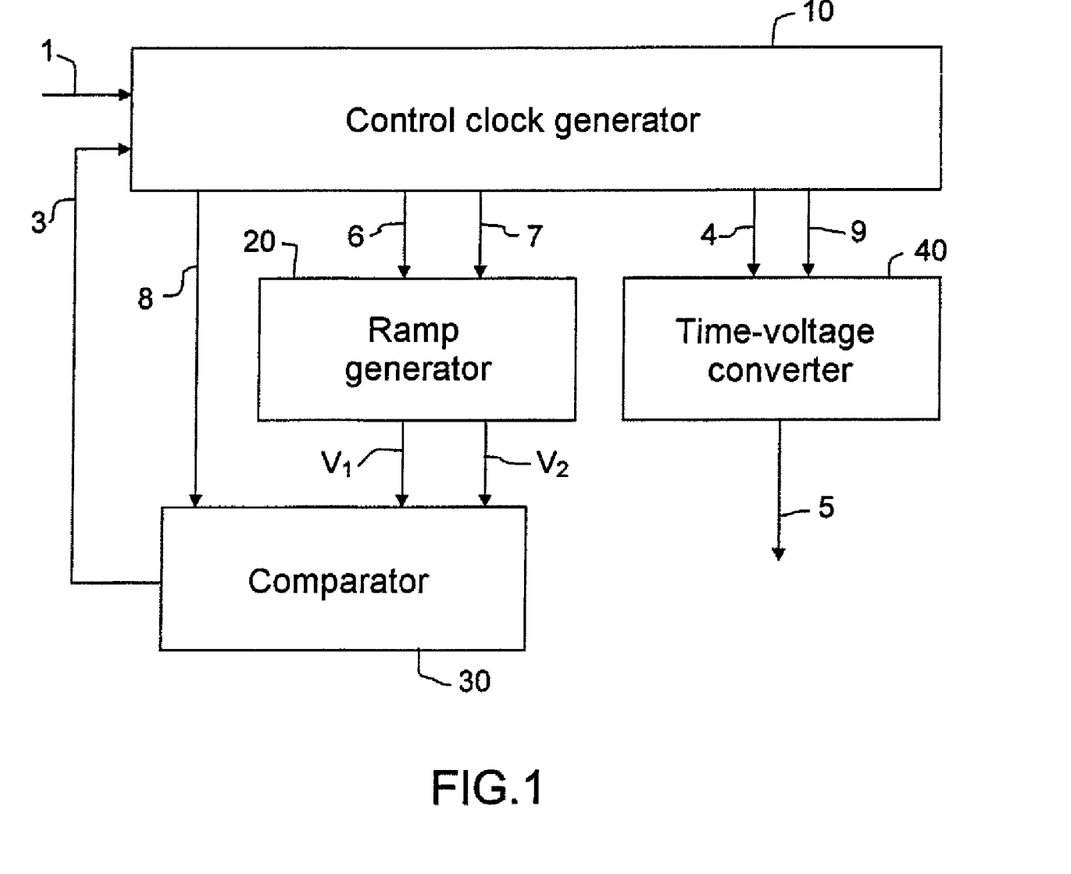
FIG. 1, a block diagram of a device according to the invention for demodulating a modulated signal.

FIG. 1 illustrates through a block diagram an embodiment of a device according to the invention for demodulating a modulated signal. The device notably comprises a control clock generator 10, a ramp generator 20, a time-voltage converter 40 and a comparator 30.

Figure 2:
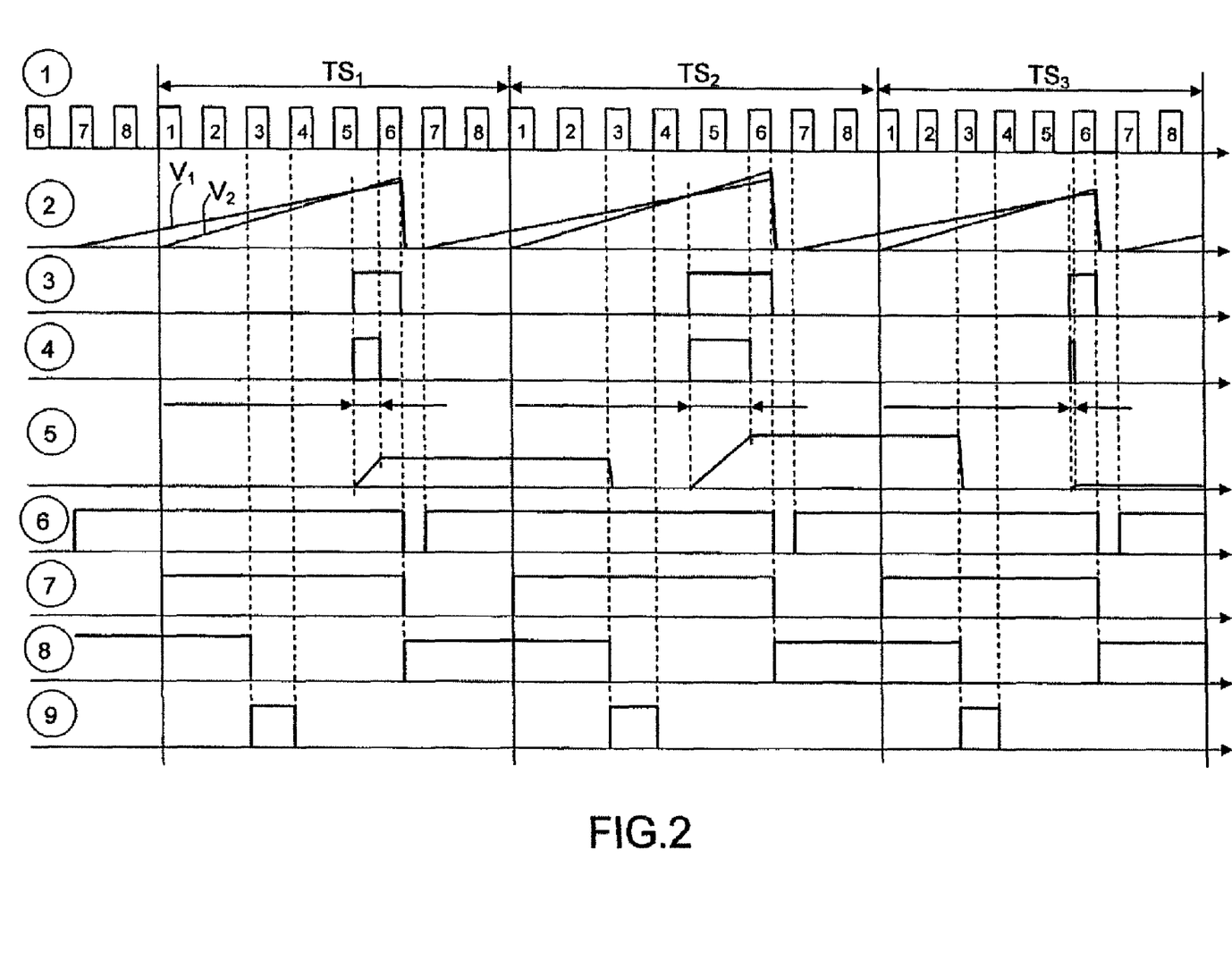
FIG. 2, a timing diagram of the signals received and generated by the device according to the invention.

FIG. 2 shows using a timing diagram the signals received and generated by the device represented in FIG. 1. The elements identical to the elements already presented on the other figures bear the same references. Consequently, the operation of the device according to the invention is described with the help of an illustrative and nonlimiting example for an input signal 1, corresponding to the modulated signal on a carrier wave of period TCIkIN. The input signal 1 has a symbol time (marked notably, on FIG. 2, $TS_1$, $TS_2$ and $TS_3$) corresponding to 8 cycles. The phase shift introduced by the receiver is applied at the start of each symbol of the input signal 1. The spread of the phase shift extends over 5 clock cycles (clock cycles 1 to 5). The clock cycles 6 to 8 have a nominal period TCIkIN, i.e. corresponding to a zero phase shift.

The control clock generator 10 receives the input signal 1. The control clock generator 10 provides synchronized digital control signals on the input signal 1 corresponding to the modulated signal. In particular, it generates a first control clock signal 6 and a second control clock signal 7 intended to control the ramp generator 20. The first and second control signals 6, 7 are composed of control pulses. For each control signal 6 and 7 a control pulse is associated with each symbol received. The temporal definition of the control signals 6 and 7 is described below in relation with other elements and signals of the demodulator device.

The first control clock signal 6 and the second control clock signal 7 are transmitted to the ramp generator 20. The ramp generator 20 is a controlled-slope ramp generator. The ramp generator 20 generates a first ramp $V_1$ depending on the first control clock signal 6. The leading edge of the control clock signal 6 is synchronous with the moment the rise of the ramp $V_1$ begins. Similarly, the trailing edge of the control clock signal 6 is synchronous with the trailing edge of the ramp signal $V_1$. The ramp generator 20 generates a second ramp $V_2$ depending on the second control clock signal 7. The rules synchronizing the control clock signal 7 and the ramp signal $V_2$ are the same as those between the control clock signal 6 and the ramp signal $V_1$.

The ramp generator 20 generates the first ramp $V_1$ and the second ramp $V_2$ with different slopes. The slopes of the ramps $V_1$ and $V_2$ of the ramp generator 20 are configured such that the ramps $V_1$ and $V_2$ intersect (in the example of FIG. 2, in the course of cycle 5) before the end of the nth cycle of each symbol whatever the possible phase shift.

For each symbol, the moment the ramps $V_1$ and $V_2$ intersect is determined and constant relative to the start of the symbol. In other words, the duration elapsing between the moment a symbol starts and the intersection of the ramps V1, V2 in the course of this symbol is constant whatever the duration of the symbol.

The comparator 30 receives the first ramp $V_1$ and the second ramp $V_2$. It generates a comparative output signal 3. Hence, during a given symbol, as long as the first ramp $V_1$ is greater than the second ramp $V_2$, the comparative signal has a voltage of approximately zero. As soon as the second ramp $V_2$ becomes greater than the first ramp $V_1$, the voltage of the comparative signal 3 flips to a determined positive nonzero voltage level VDD, for example equal to the power-supply voltage VDD of the circuit. The comparative signal 3 is then rerouted to the control clock generator 10.

The control clock generator 10 generates a pulse signal 4 PulseDPhi comprising a single pulse, called the measurement pulse, throughout the duration of each symbol. The invention notably allows optimization of the duration of the pulses of the signal 4 PulseDPhi before conversion of the duration of the pulses into voltage by the time-voltage converter 40. For a given symbol (numbered i, i being an integer) of the input signal 1, the position of the leading edge of a pulse of the signal 4 PulseDPhi is approximately constant in relation to the start of the symbol time and corresponds to the leading edge of the corresponding pulse of the comparative signal 3, i.e. to the moment the first ramp $V_1$ and the second ramp $V_2$ intersect (in the example of FIG. 2, in the course of cycle 5). The trailing edge of this pulse corresponds to the moment the total phase shift is measured. The moment the total phase shift is measured is identical for all the symbols. This moment is chosen among the latter cycles of each symbol having an approximately zero phase shift, i.e. the cycles following the nth cycle. In other words, the measurement moment occurs after a predefined duration, which may be zero, following the start of the (n+1)th cycle of the symbol (namely in the example of FIG. 2, the leading edge of cycle 6).

In order to obtain a signal 4 PulseDPhi as defined above, the control clock signals 6, 7 delivered by the clock generator must have the following characteristics. For a given symbol (numbered i, i being an integer) of the input signal 1, a control pulse of the first control clock signal 6 associated with a given symbol (numbered i) has:

a leading edge situated in the course of a cycle of the preceding symbol (numbered i-1) at a moment when the phase shift has restabilized at approximately zero, i.e. after the phase jump applied to the first n cycles of the preceding symbol (i-1);

a second trailing edge situated after the leading edge of the measurement pulse of the signal 4 PulseDPhi corresponding to the given symbol.

In the example of FIG. 2, the first control clock signal 6 is composed, for each symbol i, of a control pulse starting at cycle 7 of the preceding symbol (i-1) (on the leading edge of the 7th cycle of the input signal 1) and being completed at cycle 6 of the symbol i (on the trailing edge of the 6th cycle of the input signal 1).

Similarly, for a given symbol i of the input signal 1, a control pulse of the second control clock signal 7 associated with a given symbol i has:

a leading edge situated after the first edge of the control pulse of the first control clock signal 6 associated with the given symbol i, in the course of a clock cycle of the preceding symbol (i-1), at a moment when the phase shift has restabilized at approximately zero or at the latest at the start of the given symbol (i.e. on the leading edge of the first cycle of the symbol i); and a trailing edge situated after the leading edge of the measurement pulse of the signal 4 PulseDPhi corresponding to the given symbol, for example at the same moment as the trailing edge of the corresponding control pulse of the first control clock signal 6.

In the example of FIG. 2, the second control clock signal 7 is composed, for each symbol i, of a pulse starting synchronized with the leading edge of the first cycle of the symbol i and being completed synchronized with the trailing edge of cycle 6 of the symbol i.

The duration of the pulse included in the signal 4 PulseDPhi is then converted into a proportional voltage value Vdem-i by a conventional time-voltage ramp conversion device, such as for example the time-voltage converter 40, which delivers an output signal 5. When the ramp signal $V_2$ becomes greater than the ramp signal $V_1$, the ramp of the output signal is created, this ramp finishing on the trailing edge of the measurement signal 4. It is followed by a plateau finishing on the trailing edge of the clock signal 8. An analogue-to-digital conversion system digitizes the plateau values at the rate of a sampling signal, not shown, comprising a sampling pulse arriving in the course of each plateau phase of the signal 5.

The control clock generator 10 may also deliver a zero reset signal for the output voltage 9 comprising pulses to the time-voltage converter in order to request this to reset to zero the ramp voltage in the output signal 5. By way of example, these pulses are generated in the course of cycle 3 for each symbol time. The measurement of the ramp by the time-voltage converter 40 provides the phase-shift value for a given symbol time.

Figure 3:
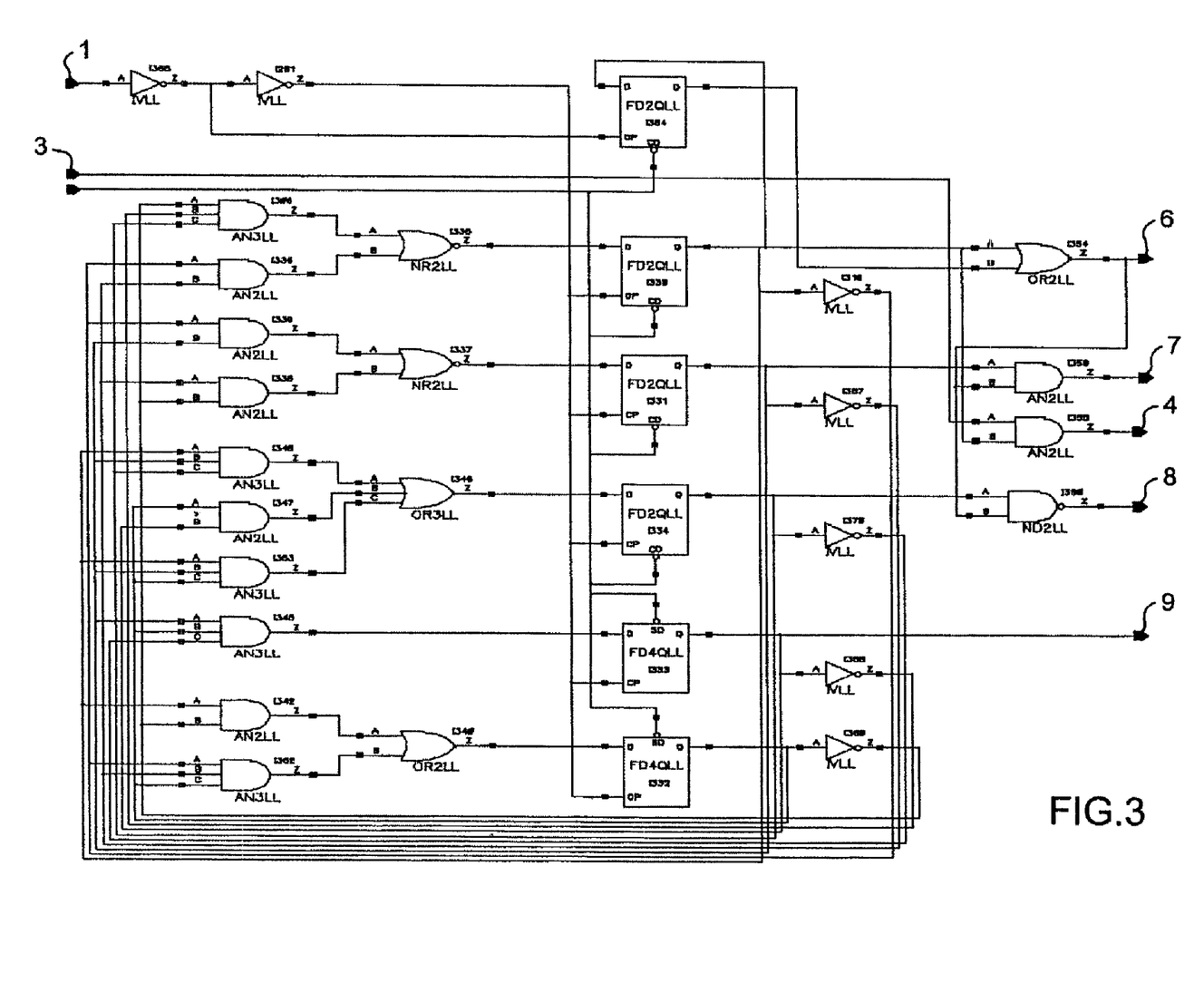
FIG. 3, a circuit diagram of an embodiment of the control clock generator.

FIG. 3 shows through a circuit diagram an embodiment of the control clock generator 10. The embodiment of the control clock generator 10 is notably suited to generate signals 6, 7, 4, 9 as shown in FIG. 2 from the signal 1 as shown in FIG. 2. Edge triggering notably ensures synchronization of the control clocks.

Figure 4:
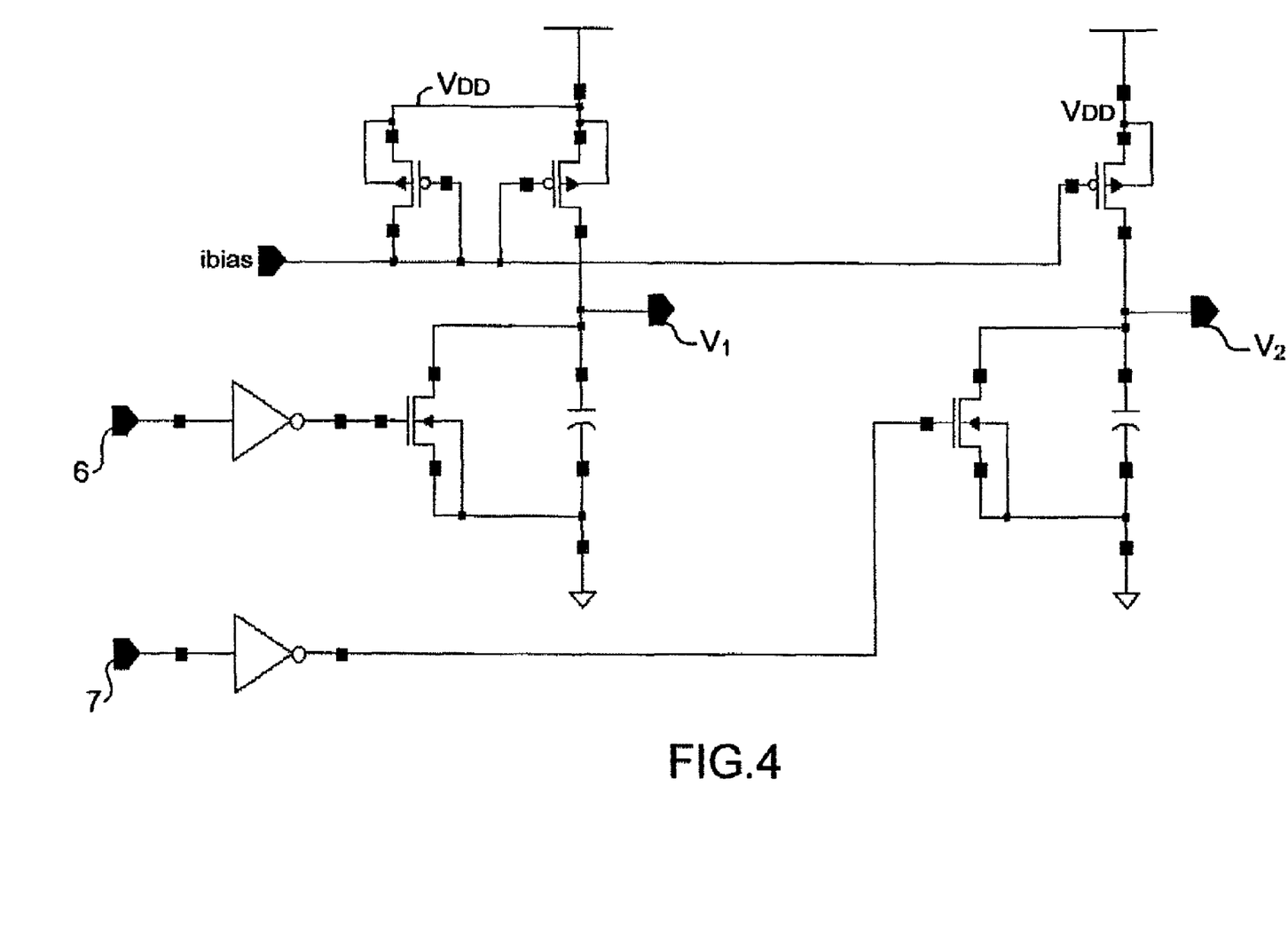
FIG. 4, a circuit diagram of an embodiment of the ramp generator.

FIG. 4 shows through a circuit diagram an embodiment of the ramp generator 20. The ramps are created by charging a capacitor at constant current. The charging current fixed by the input ibias is the same for the first ramp $V_1$ and for the second ramp $V_2$. Conversely, the capacitors to be charged (of capacitance C1 for the first ramp $V_1$ and C2 for the second ramp $V_2$ on the figure) are different. The start and the end of the ramps are produced by switches (for example, metal oxide semiconductor switches) controlled by the first control clock signal 6 and the second control clock signal 7. If the initial time lag of the two ramps $V_1$ and $V_2$ is fixed at twice the period TClkIN, the following mathematical expression provides the temporal position of the intersection point of the ramps $V_1$ and $V_2$, designated Tedge-reference, relative to the start of the symbol time:

Tedge-reference=2*$TClkIN$/(C1/C2−1)

Hence if the capacitance C1 is equal to 1.5 pF and the capacitance C2 to 1 pF, the ratio C1/C2 is then equal to 1.5, the temporal position of the intersection point of the ramps $V_1$ and $V_2$ Tedge-reference is then equal to four times the period TClkIN. The position Tedge-reference depends only to the first order on the capacitance ratio, which allows good precision without parameter adjustment, whatever the various noise sources may be, notably those linked to the variations in the power-supply voltage VDD of the device.

Figure 5:
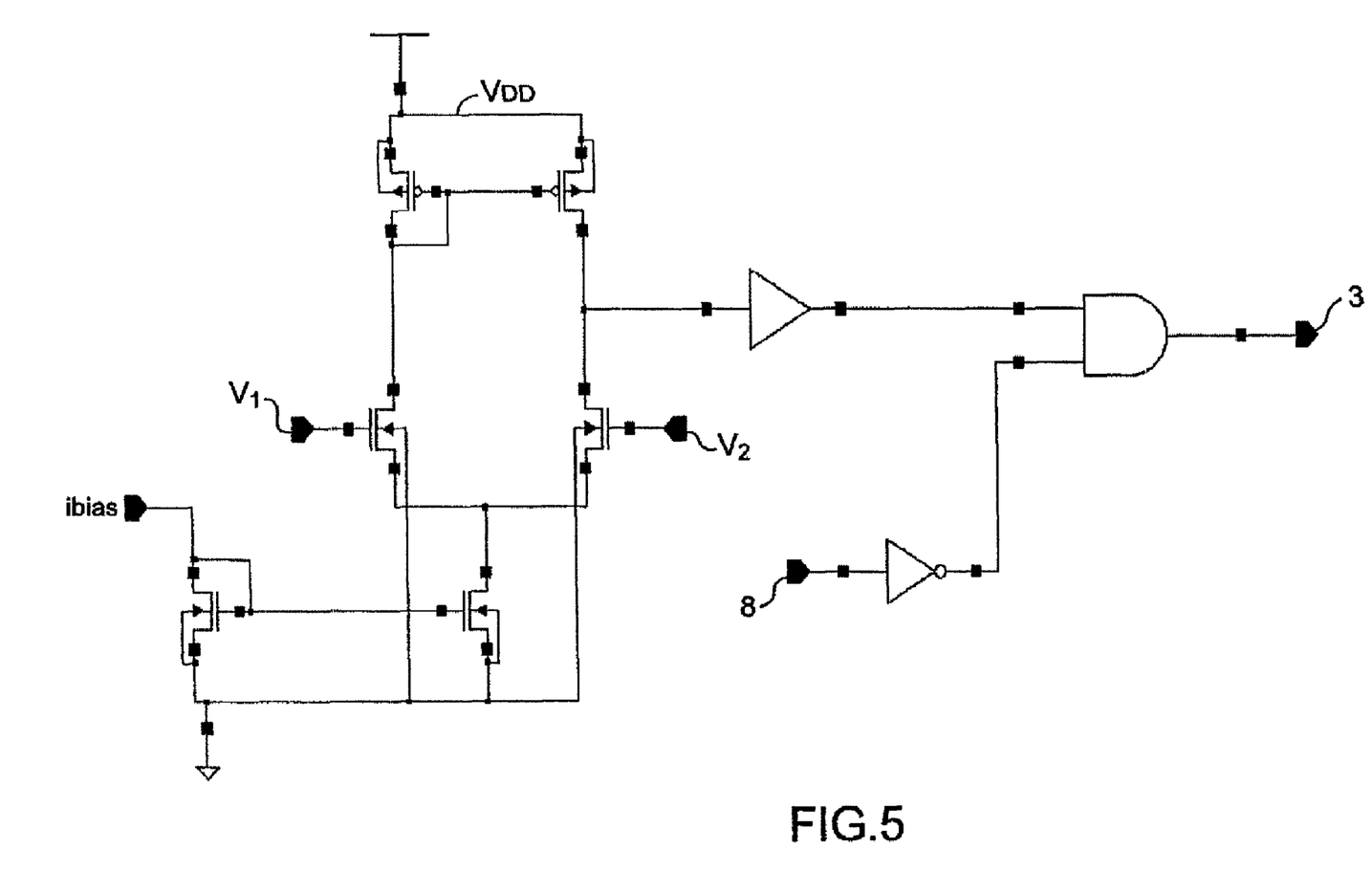
FIG. 5, a circuit diagram of an embodiment of the voltage comparator.

FIG. 5 shows through a circuit diagram an embodiment of the voltage comparator 30. The ramp $V_1$ is sent to the negative input of the device and the ramp $V_2$ is sent to the positive input of the device. As long as the ramp $V_1$ is greater than the ramp $V_2$, the comparative signal 3 delivered by the comparator remains at 0V. As soon as the ramp $V_2$ becomes greater than the ramp $V_1$, the comparator 30 delivers a strictly positive voltage VDD. The bias current of the differential stage is fixed by the input ibias. A zero reset signal 8 for the comparator may be generated by the control clock generator 10. The signal 8 allows the voltage of the comparative signal 3 to be blocked at 0V, no matter what the input voltages. The signal 8 consequently allows bounce problems to be eliminated during resetting of the ramps $V_1$ and $V_2$ to zero when the ramps $V_1$ and $V_2$ are below the operating threshold of the comparator 30.

Figure 6:
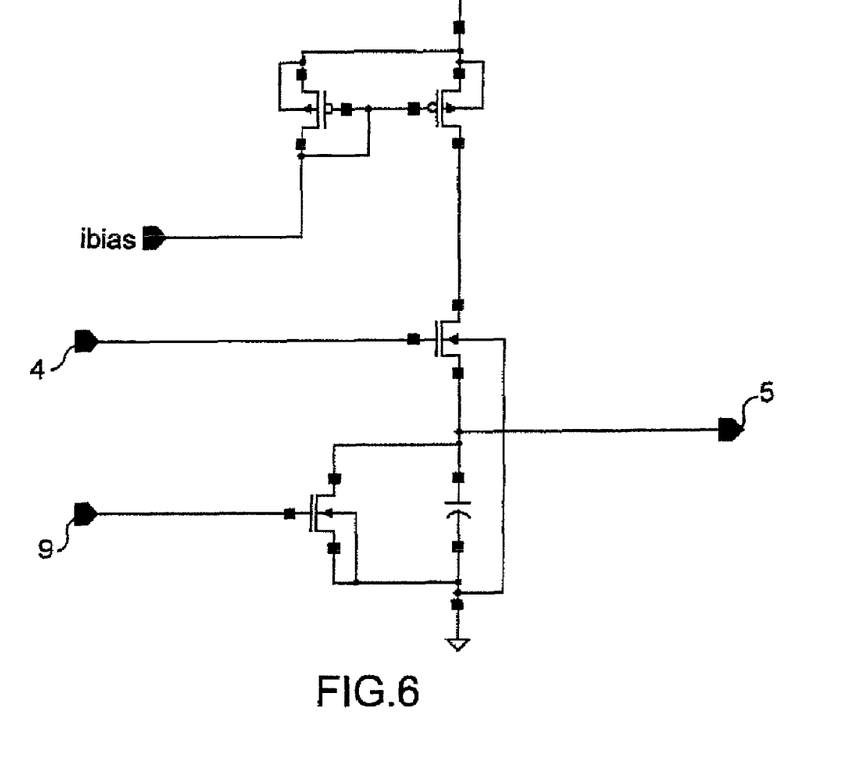
FIG. 6, a circuit diagram of an embodiment of the time-voltage converter.

FIG. 6 shows through a circuit diagram an embodiment of the time-voltage converter 40. It provides the output signal 5, the "plateau" values of which after each ramp are proportional to the durations of the pulses of the signal 4 PulseDPhi. The conversion is conventionally carried out by charging a capacitor at constant current. The charging starts at the leading edge of the pulse and ends on the trailing edge. The capacitance is discharged through the zero reset signal for the output voltage 9. The charging current is fixed by the input ibias. The start and the end of the ramp are produced by a switch (for example, a metal oxide semiconductor switch) controlled by the signal 4 PulseDPhi.

The person skilled in the art will furthermore be able to imagine other embodiments of a demodulator device according to the present invention.

It is possible, for example, to use a demodulator device according to the present invention comprising a generator of a single voltage ramp having the same characteristics as the voltage ramp $V_1$ of the device described above. This single voltage ramp is supplied to a comparator which furthermore receives a reference signal. This reference signal may be a reference voltage. In this case the comparator switches when the voltage ramp reaches this reference voltage.

According to another embodiment of a demodulator device according to the present invention, the leading edge of the single measurement pulse of a given symbol i is produced by means of a delay generation circuit. This delay generation circuit detects a leading or trailing edge of a cycle of the preceding symbol (i-1) at a moment when the phase shift has restabilized at approximately zero, or detects the leading edge of the first cycle of the symbol i and produces, after a predefined duration from the start of this detection, the leading edge of the measurement pulse of the symbol i.

Among other things, the polarity of the signals provided by the control clock generator and the comparator may be inverted, the circuits controlled by the control signals (ramp generator, time-voltage converter) then being produced with a complementary logic.

Figure 7:
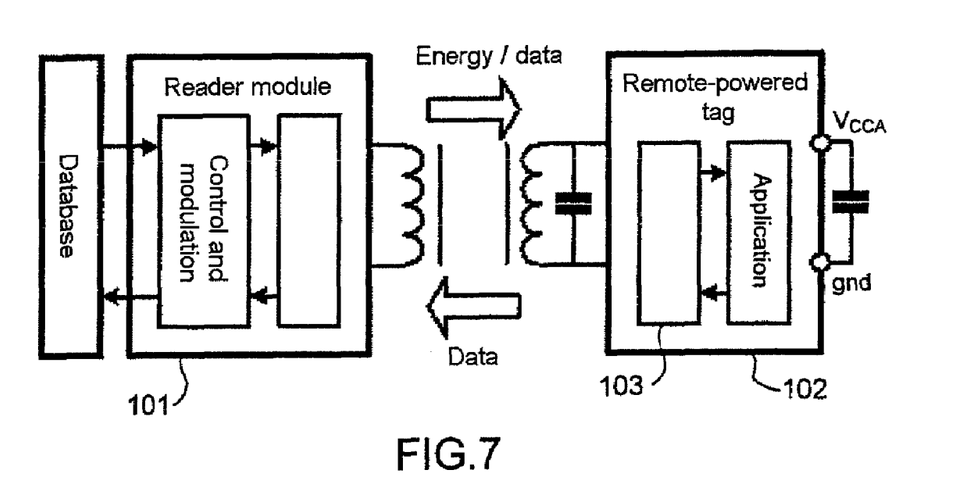
FIG. 7, a circuit diagram of an example of use of the device according to the invention within a radiofrequency identification system with an inductive connection.

FIG. 7 illustrates through a circuit diagram an example of use of the device according to the invention within a radiofrequency identification system with an inductive connection. The device according to the invention may be used in the context of applications requiring a high rate of data transfer with a carrier wave frequency between the HF and VHF bands. By way of nonlimiting example, the device according to the invention may be used for an application in the field of radiofrequency identification (or RFID for RadioFrequency Identification Device). The main characteristics of a signal used for a radiofrequency identification application with a standard frequency of the carrier wave of 13.56 MHz are typically the following:

Duration of the symbol time: 590 ns;
number of phase-coding bits: 3 bits;
data rate: 5085 MBits/s.

The radiofrequency identification system with an inductive connection shown in FIG. 7 comprises a stationary reader module 101 collaborating with mobile tags 102. When a mobile tag 102 is situated in the active field of the reader module 101, the reader module 101 transmits data and energy via a magnetic field to the mobile tag 102. In response, the mobile tag 102 transmits data toward the reader module 101. Communication between the reader module 101 and the mobile tag 102 is established through an inductive connection with a phase modulated carrier wave. The modulated carrier wave is received via a matching antenna of the mobile tag 102 (matching in inductance and capacitance) in order to be formed if necessary. The device according to the invention may, for example, be integrated in a front-end 103 in order to carry out the demodulation of the phase of the carrier wave thus received.

The compactness of the device according to the invention permits its implementation using silicon technologies with a low power-supply voltage and low consumption. The device according to the invention can therefore easily be integrated in a remote-powered tag. The low consumption of the device according to the invention together with its compactness and its low power-supply voltage allow the silicon surface of the tag circuit to be optimized and the cost of the product and the consumption at the maximum transmission distance to be directly reduced. The device according to the invention allows the attainment of high data rates of communication responding to the requirements in the fields of identifying persons and multimedia.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for demodulating an input signal containing information being conveyed by phase modulation of a carrier wave, wherein said signal being generated by means of a transmitter controlling a phase variation in said carrier wave, for each symbol comprising N cycles, N being an integer strictly greater than 1, the phase variation stretching on the receiver side over n cycles, n being an integer greater than 1 and less than N, said device comprising:
  means for generating a measurement pulse, for each symbol received, said means capable of:
    generating a first edge of the measurement pulse corresponding to the symbol considered after a first constant duration from the moment the symbol considered starts, the first duration being less than the minimum duration of the n first cycles of a symbol of the input signal; and
    generating a second edge of the measurement pulse corresponding to the symbol considered after a second duration, which may be zero, following the start of the (n+1)th cycle of the symbol considered; and
  conversion means generating an output signal with a voltage varying as a function of the duration of the pulses produced.

2. The device as claimed in claim 1, comprising a ramp generator, a comparator and a control clock generator receiving the input signal and generating the first and second control clock signals composed of control pulses, a control pulse being associated with each symbol received, and in which
  a control pulse of the first control clock signal associated with a given symbol has:
    a first edge situated in the course of a clock cycle of the preceding symbol, at a moment when the phase shift has restabilized at approximately zero;
    a second edge situated after the first edge of the measurement pulse corresponding to the given symbol;
  a control pulse of the second control clock signal associated with a given symbol has:
    a first edge situated after the first edge of the control pulse of the first control clock signal associated with the given symbol, in the course of a clock cycle of the preceding symbol, at a moment when the phase shift has restabilized at approximately zero or at the latest at the start of the given symbol; and
    a second edge situated after the first edge of the measurement pulse corresponding to the given symbol;
  the ramp generator delivering:
    a first ramp during each control pulse of the first control clock signal;
    a second ramp during each control pulse of the second control clock signal, the second ramp having a higher slope than that of the first ramp;
  the comparator receiving the first ramp and the second ramp and generating a comparative output signal from which the control clock generator generates the single measurement pulse for each symbol.

3. The device as claimed in claim 2, wherein the control clock generator generates for a given symbol:
  the first edge of the single measurement pulse at the moment the first ramp and the second ramp intersect; and
  the second edge of the single measurement pulse after a predefined duration, which may be zero, following the start of the (n+1)th cycle of the given symbol.

4. The device as claimed in claim 2, wherein the ramp generator comprises capacitors charged at a constant current to generate ramps, the capacitances of said capacitors to be charged being different.

5. The device as claimed in claim 2, wherein the comparator delivers the comparative signal, the voltage of which in the course of a symbol is:
  equal to a first value as long as the first ramp is greater than the second ramp;
  equal to a second value as soon as the second ramp becomes greater than the first ramp;
  becomes equal again to the first value on the command of a zero reset signal.

6. The device as claimed in claim 2, wherein the voltage ramp is supplied to a comparator which furthermore receives a reference voltage, the comparator switching when the voltage ramp reaches this reference voltage.

7. The device as claimed in claim 1, wherein the leading edge of the single measurement pulse for a symbol i is produced by means of a delay generation circuit, this delay generation circuit detecting a leading or trailing edge of a cycle i-1 of the preceding symbol, at a moment when the phase shift has restabilized at approximately zero.

8. The device as claimed in claim 1, wherein the leading edge of the single measurement pulse for a symbol i is produced by means of a delay generation circuit, this delay generation circuit detecting the leading edge of the first cycle of the symbol i and produces, after a predefined duration from the start of this detection, the leading edge of the measurement pulse of the symbol i.

9. The use of the device as claimed in claim 1 in a radiofrequency identification system with an inductive connection comprising a reader module collaborating with mobile tags, communication capable of being established between the reader module and the mobile tag through an inductive connection with a phase modulated carrier wave, the device according to the invention being included in the mobile tag to effect the demodulation of the phase of the carrier wave received.

10. The device as claimed in claim 3, wherein the ramp generator comprises capacitors charged at a constant current to generate ramps, the capacitances of said capacitors to be charged being different.

11. The device as claimed in claim 3, wherein the comparator delivers the comparative signal, the voltage of which in the course of a symbol is:
  equal to a first value as long as the first ramp is greater than the second ramp;
  equal to a second value as soon as the second ramp becomes greater than the first ramp;
  becomes equal again to the first value on the command of a zero reset signal.

12. The device as claimed in claim 4, wherein the comparator delivers the comparative signal, the voltage of which in the course of a symbol is:
  equal to a first value as long as the first ramp is greater than the second ramp;
  equal to a second value as soon as the second ramp becomes greater than the first ramp;
  becomes equal again to the first value on the command of a zero reset signal.

13. The device as claimed in claim 2, wherein the voltage ramp is supplied to a comparator which furthermore receives a reference voltage, the comparator switching when the voltage ramp reaches this reference voltage.

14. The device as claimed in claim 3, wherein the voltage ramp is supplied to a comparator which furthermore receives a reference voltage, the comparator switching when the voltage ramp reaches this reference voltage.

15. The device as claimed in claim 2, wherein the leading edge of the single measurement pulse for a symbol i is produced by means of a delay generation circuit, this delay generation circuit detecting a leading or trailing edge of a cycle i-1 of the preceding symbol, at a moment when the phase shift has restabilized at approximately zero.

16. The device as claimed in claim 3, wherein the leading edge of the single measurement pulse for a symbol i is produced by means of a delay generation circuit, this delay generation circuit detecting a leading or trailing edge of a cycle i-1 of the preceding symbol, at a moment when the phase shift has restabilized at approximately zero.

17. The device as claimed in claim 4, wherein the leading edge of the single measurement pulse for a symbol i is produced by means of a delay generation circuit, this delay generation circuit detecting a leading or trailing edge of a cycle i-1 of the preceding symbol, at a moment when the phase shift has restabilized at approximately zero.

18. The device as claimed in claim 2, wherein the leading edge of the single measurement pulse for a symbol i is produced by means of a delay generation circuit, this delay generation circuit detecting the leading edge of the first cycle of the symbol i and produces, after a predefined duration from the start of this detection, the leading edge of the measurement pulse of the symbol i.

19. The device as claimed in claim 3, wherein the leading edge of the single measurement pulse for a symbol i is produced by means of a delay generation circuit, this delay generation circuit detecting the leading edge of the first cycle of the symbol i and produces, after a predefined duration from the start of this detection, the leading edge of the measurement pulse of the symbol i.

20. The device as claimed in claim 4, wherein the leading edge of the single measurement pulse for a symbol i is produced by means of a delay generation circuit, this delay generation circuit detecting the leading edge of the first cycle of the symbol i and produces, after a predefined duration from the start of this detection, the leading edge of the measurement pulse of the symbol i.

* * * * *